United States Patent
Ghassabian

(10) Patent No.: US 6,567,523 B1
(45) Date of Patent: May 20, 2003

(54) WRIST-MOUNTED TELEPHONE DEVICE

(76) Inventor: Firooz Ghassabian, Kashani Street 13, 69499 Ramat-Aviv (IL)

(*) Notice: Subject to any disclaimer, the term of this patent is extended or adjusted under 35 U.S.C. 154(b) by 0 days.

(21) Appl. No.: 09/331,346

(22) PCT Filed: Dec. 18, 1997

(86) PCT No.: PCT/IL97/00414

§ 371 (c)(1), (2), (4) Date: Jun. 17, 1999

(87) PCT Pub. No.: WO98/27702

PCT Pub. Date: Jun. 25, 1998

(30) Foreign Application Priority Data

Dec. 19, 1996 (IL) .................................. 119873
Apr. 4, 1997 (IL) .................................. 120605

(51) Int. Cl.$^7$ ............................................... H04M 1/00
(52) U.S. Cl. .................................................. 379/433.1
(58) Field of Search ................... 379/428, 430, 379/433, 433.1; 455/575, 90; 224/164

(56) References Cited

U.S. PATENT DOCUMENTS

| | | | |
|---|---|---|---|
| 4,847,818 A | 7/1989 | Olsen | 368/10 |
| 4,985,878 A | 1/1991 | Yamada | 368/88 |
| 5,008,864 A | 4/1991 | Yoshitake | 368/10 |
| 5,214,623 A | 5/1993 | Seager | |
| 5,224,076 A | 6/1993 | Thorp | |
| 5,239,521 A | 8/1993 | Blonder | 368/10 |
| 5,274,613 A | 12/1993 | Seager | |
| 5,381,387 A | 1/1995 | Blonder | |
| D358,553 S | 5/1995 | Murakami | |
| D360,590 S | 7/1995 | Murakami | |
| 5,499,292 A | 3/1996 | Blonder et al. | |
| 5,564,082 A | 10/1996 | Blonder | 455/90 |
| 5,659,611 A | 8/1997 | Saksa | 379/433 |
| 5,695,885 A | 12/1997 | Malhi | 429/7 |
| 5,872,744 A * | 2/1999 | Taylor | 224/164 |
| 5,898,161 A | 4/1999 | DeVita | 235/462.44 |
| 5,907,615 A * | 5/1999 | Kaschke | 379/433 |
| 5,966,671 A * | 10/1999 | Mitchell et al. | 455/575 |
| 6,035,035 A * | 3/2000 | Firooz | 379/433 |
| 6,078,803 A * | 6/2000 | Martinez | 455/90 |
| 6,212,414 B1 | 4/2001 | Alameh et al. | 455/575 |

FOREIGN PATENT DOCUMENTS

| | | |
|---|---|---|
| CH | 587471 A | 4/1977 |
| EP | 0602828 | 1/1994 |
| EP | 0698983 | 2/1996 |
| WO | 9535622 | 12/1995 |
| WO | 9633569 | 10/1996 |

* cited by examiner

Primary Examiner—Jack Chiang
(74) Attorney, Agent, or Firm—Sofer & Haroun, LLP

(57) ABSTRACT

A wrist-mounted cellular telephone device (1) for attaching to a wearer's wrist (5). The device (1) comprises a cellular phone mechanism mounted in a housing (2) and a battery power source coupled to the housing (2). The battery power source circumferentially extends along at least a substantial portion of the wearer's wrist (5).

25 Claims, 5 Drawing Sheets

WRIST-MOUNTED TELEPHONE DEVICE

FIELD OF THE INVENTION

The present invention generally relates to portable cellular telephone devices.

BACKGROUND OF THE INVENTION

A cellular telephone is a familiar personal communication accessory which is widely used. Early models were bulky, being carried in motor vehicles or in back packs. Further developed models were stored in a pocket or clipped onto a belt when not in use. They were, therefore, prone to falling, breaking, or simply being forgotten. Additionally, these models suffered from the time loss caused by taking such cellular telephones out of a garment pocket, or belt holder, adjusting the phone's orientation to actuate an answer mode.

A number of wrist telephone devices have been developed and disclosed, for example, in U.S. Pat. Nos. 5,239,521; 5,274,513; 5,224,076. In all these disclosures a telephone device is typically in the form of a wristwatch fastened to the user's wrist via a strap, wherein a cellular phone mechanism replaces that of a watch in its conventional location. The main components of a cellular phone mechanism, such as transceiver, telephone call initiating means, a keyboard, a voice recognition device, a display, etc., as well as a battery power source, are accommodated within a common case. A microphone and a speaker are usually incorporated within the strap.

For example, in a device disclosed in the U.S. Pat. No. 5,239,521, a strap has a member pivotally coupled thereto in a manner to be rotatable between its inoperative position, being aligned with and fastened to the strap, and an operative position, being perpendicular to the strap. The pivotal member functions as an ear piece, having a receiver at its free end and a microphone mounted on or close to its opposite end, proximate to the strap.

The telephone devices disclosed in the above patents suffer from a common disadvantage associated with the fact that a battery is substantially small in size and, therefore, low-power. Indeed, the battery is always a part of the case containing the phone mechanism, which case is supported on the user's wrist like a watch unit by means of a conventional strap.

WO Publication No. 95/35622 discloses a telephone device which may be used as a wrist-watch cellular phone by mounting it onto a conventional strap to be attached to the user's wrist. Here, a battery is accommodated in a separate case which is, at its one end, coupled by hinges to the end of a case containing the phone mechanism. However, the battery is still of a small size and associated with the same portion of the user's wrist as the case containing the cellular phone mechanism. The two interconnected cases are typically associated with the strap which connects their free ends and supports them on the user's wrist.

It is thus evident that in the conventional devices of the kind specified a battery is too small to meet the requirements of the user, while a strap always occupies at least half of the user's wrist, which is free of both the battery and phone mechanism.

Additionally, most of the known cellular phone devices suffers from a disturbance caused thereby when it starts to ring, for example, when the user is at public gathering, concert, lecture, or the like. It is often the case that the user wishes his cellular phone to be permanently switched on so as to be immediately informed of an incoming call. However, it would clearly be desirable for the phone device to be actuated in a manner to inform the user of an incoming call without disturbing others within his/her close vicinity. In order to solve such a problem, a vibrator is usually included in the cellular phone mechanism and is connected to a phone ringer in a manner to cause a continuous vibration of the whole cellular phone device when actuated by an incoming call. It is understood that this act of vibrating the whole device results in significant waste of energy.

SUMMARY OF THE INVENTION

It is thus a major object of the invention to eliminate the above listed and other disadvantages of conventional cellular phone devices and provide a novel wrist-mounted telephone device.

It is a further object of the invention to provide such a device which is shaped like a bracelet, wherein all main components of a cellular phone mechanism and a battery power source are distributed around the user's wrist in the most effective manner. This enables to design a battery of significantly larger dimensions and easily replaceable without disturbing the cellular phone mechanism itself.

It is a still further object of the present invention to provide such a device which includes a vibrator which, when actuated, indicates a wearer of an incoming call without causing the vibration of the whole device.

There is thus provided according to one aspect of the present invention a wrist-mounted telephone device for attaching to a wearer's wrist, the device comprising:

a cellular phone mechanism accommodated in a housing;

a battery power source coupled to said housing, wherein the battery power source circumferentially extends along at least a substantial portion of the wearer's wrist.

Preferably, the housing and the battery power source form together a first and a second interlocking parts, respectively, of a bracelet. The construction may be such that at least one of the first and second portions of the bracelet has C-shaped or flat geometry.

It is understood that the battery power source is adapted to be electrically connected to the cellular phone mechanism. The electrical connection may be in the form of wires.

Preferably, the battery power source substantially occupies the wearer's wrist. The housing containing the cellular phone mechanism may be located at a palm side of the wearer wrist.

The housing and the battery power source are coupled by a connector providing mechanical engagement thereof. The connector may comprise hinges, or a clasp mechanism, or at least one belt. The connector is substantially small so as not to occupy a significant portion of the wearer's wrist. In the case of the belt, it may be formed of plastic, fabric, or the like material.

The cellular phone mechanism comprises an ear piece extendable towards a region of a palm of the wearer and retractable to a region of the housing. Preferably, the ear piece is extendable along an axis of the wearer's arm. The ear piece may be extended by means of a flip open cover pivotally coupled to the housing and may be further extended by at least one telescopic, or accordion like segment of the cover. Alternatively the ear piece of the cellular telephone mechanism may be mounted at an end of a tube having a securing arrangement for securing to a wearer's finger. Upon release of the securing arrangement, the tube is retracted into the housing by means of a resilient biasing means coupled to the end of the tube.

The battery power source may comprise a single battery circumferentially extending along at least a substantial portion of the wearer's wrist, or a plurality of batteries coupled to each other and each circumferentially extending along the wearer's wrist. It is understood that a battery of any kind may be employed. The battery may be removably accommodated within a case.

If the plurality of batteries is employed, each of them may be accommodated within its case and the cases are coupled to each other. To this end, the device, preferably, comprises an electric circuit adapted for selectively connecting the cellular phone mechanism to a preset one of the plurality of batteries.

Preferably, the cellular phone mechanism includes an antenna, which may be of a telescoping kind. The device may also comprise an indication means responsively coupled to the cellular phone mechanism for alerting the wearer of an incoming call. The indication means preferably comprises a vibrator in the form of a mechanical assembly including a reciprocating prong for prodding the wearer's wrist. The device may also comprise at least one data display panel.

Preferably, the device also comprises a watch unit. The watch unit and housing are disposed in a diametrically opposite relationship on the wearer's wrist.

According to another aspect of the present invention there is provided a wrist-mounted telephone device for attaching to a wearer's wrist, the device comprising:

a cellular phone mechanism accommodated in a housing;

a battery power source coupled to said housing; and a wrist-watch unit disposed diametrically opposite to the housing containing the cellular phone mechanism.

The battery power source may be contained in a case coupled to the housing. The wrist-watch unit may be electrically and/or mechanically connected to the battery power source.

BRIEF DESCRIPTION OF THE DRAWINGS

In order to understand the invention and to see how the same may be carried out in practice, several preferred embodiments will now be described, by way of example only, with reference to the accompanying drawings, in which.

DETAILED DESCRIPTION OF THE PREFERRED EMBODIMENTS

Figure 1:
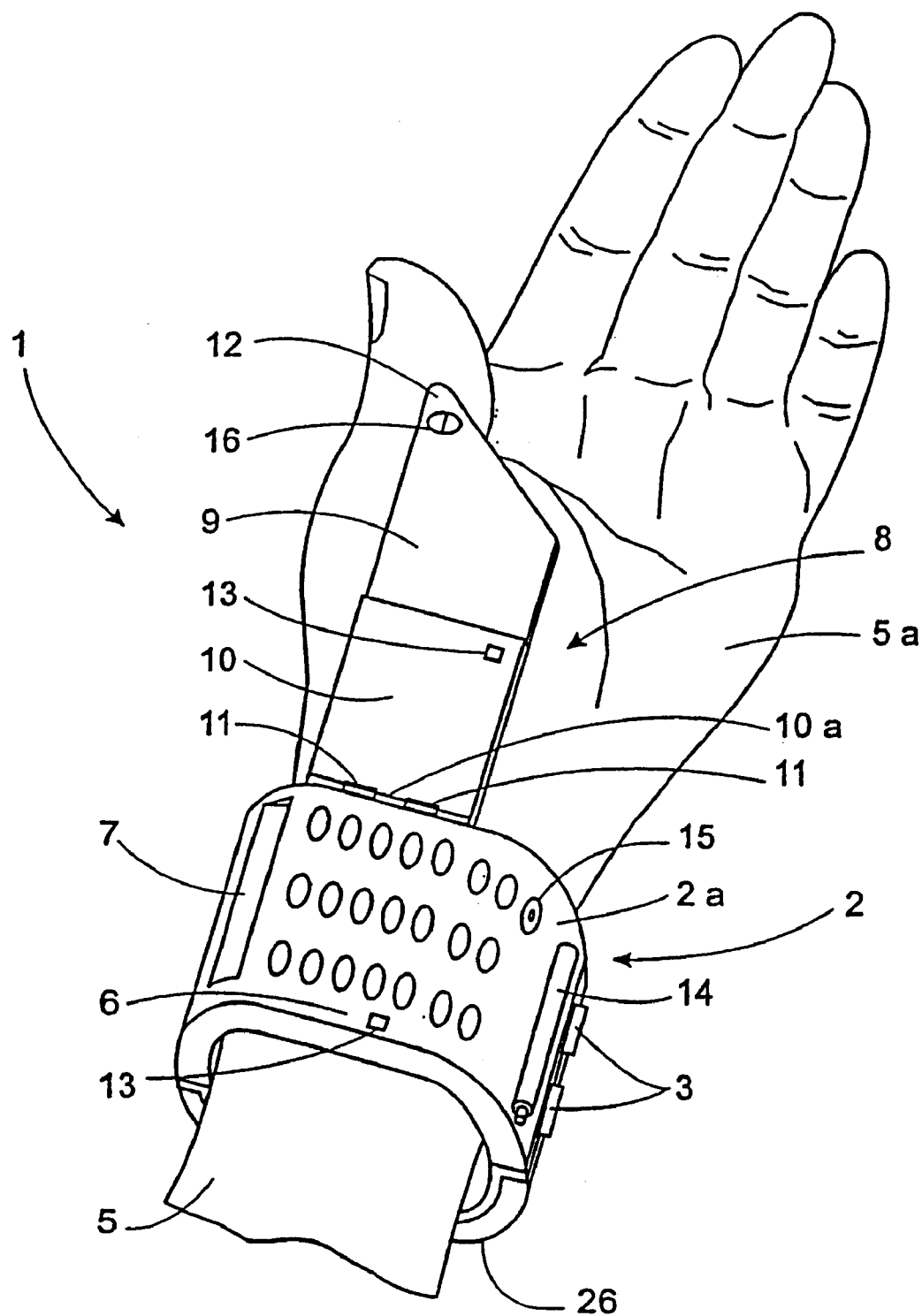
FIG. 1 is a pictorial illustration of a wrist-mounted cellular phone device according to one embodiment of the invention.
Figure 2:
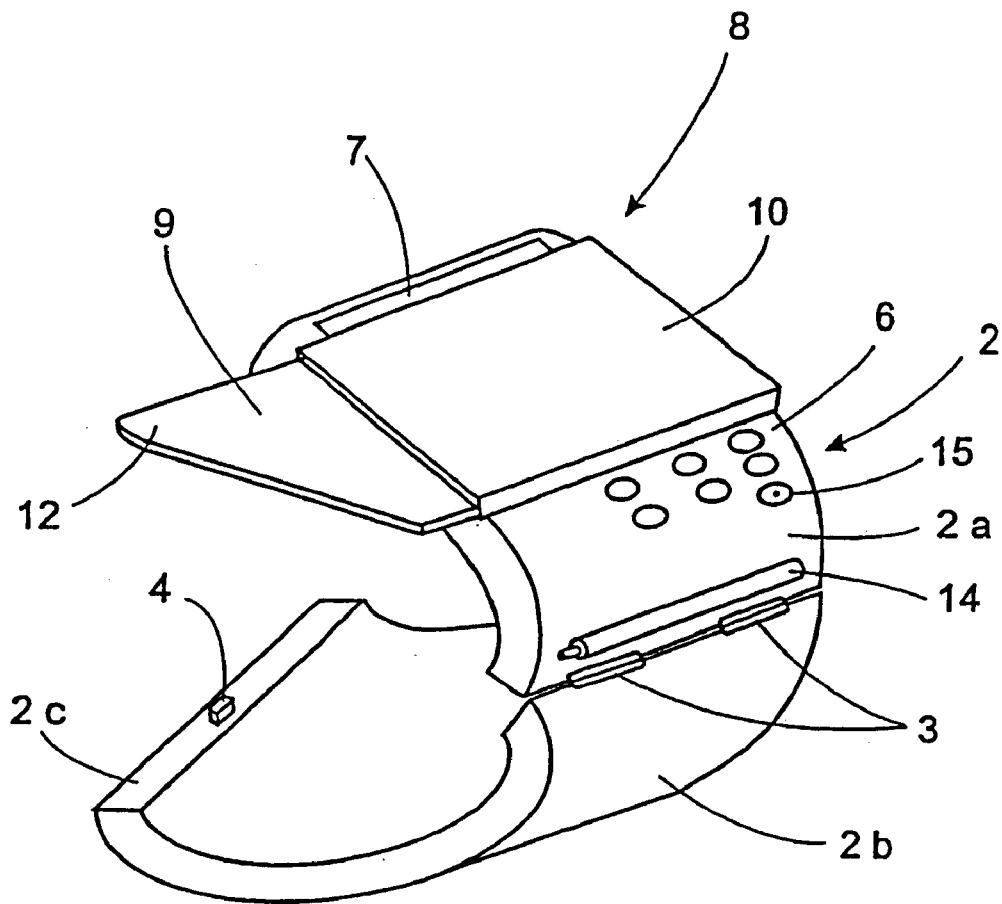
FIG. 2 is a pictorial view of the device of FIG. 1 more specifically illustrating an unlocked position thereof.

Referring to FIGS. 1 and 2 there is shown a device generally designated 1 which comprises a housing in the form of a bracelet 2 having two C-shaped portions 2a and 2b. The portions 2a and 2b are at one end permanently coupled by a pair of hinges 3 so as to be pivotal one relative to the other between a closed state of the bracelet 2 when being worn on a wrist 5 of the user, and an open state for removing the bracelet from the user's wrist The portions 2a and 2b at an opposite end are interlocked by a clasp mechanism of known type, for example having a latch 4 made on an inside butt end 2c to engage a respective recess made in an interfacing butt end (not shown) of the portion 2a. It is understood that appropriate means are provided for easily unlocking the latch 4 by the user's hand.

It is also appreciated that any other coupling mechanism may be employed for the same purpose of providing such a mechanical engagement between the portions 2a and 2b that, on the one hand, is insured against accidental unlocking, and, on the other hand, is adapted to be easily unlocked by the user. For example, a magnetic clasp mechanism may be used.

As shown in FIG. 1, the bracelet 2 wraps around the user's wrist 5 in such a manner that all main components of a conventional cellular phone mechanism, except for the battery, are disposed at one side 5a of the wrist 5, for example, a palm side. Thus, the portion 2a is provided on the outside thereof with a conventional keypad 6 easily available for the user, and a liquid crystal display 7. The display 7 is typically capable of displaying a number currently dialed by the user when transmitting an outgoing call from the device 1, and also a number of a remote telephone device generating an incoming call, if such option is authorized by an owner of the remote telephone.

Coupled to the portion 2a of the bracelet 2 is a flip open telescopic cover, generally at 8, formed of two hinged plates 9 and 10. The plate 10 is recessed and slightly larger than the plate 9 so as to receive the latter thereinside in a conventional manner. To this end, the plate 10 may be provided internally with a pair of spaced parallel guides, extending along opposite sides of the plate 10 for supporting the plate 9. Such a telescopic arrangement is well known and, therefore, is not specifically illustrated. Hence, the plate 9 is adapted for sliding movement between a folded position thereof when being partly inserted into the plate 10 (FIG. 2) and an extracted position completely projecting from the plate 10 (FIG. 1). An end 12 of the plate 9 is angled and, when in the folded position of the plate 9, protrudes from the plate 10, as better shown in FIG. 2. The plate 10 is at its one end connected by a pair of hinges 11 to the portion 2a, so as to be rotatable relative to the portion 2a between an open, extracted position of the plate shown in FIG. 1, and a closed, retracted position, when it partly covers the keypad 6. Such a partly retracted position is shown in FIG. 2. To this end, the cover 8 may be formed of a flexible material. A two-segment magnetic clasp, generally at 13, is suitably accommodated on the portion 2a and the plate 10, to keep the cover 8 closed.

It is appreciated that the magnetic clasp 13 may be replaced by any other suitable means, for example, a spring mechanism. It should be noted, although not specifically shown, that the display 7, or an additional suitable display may be located on either side of the plate 10.

Further provided is a conventional antenna 14 which may be a telescopic antenna, mounted on the portion 2a opposite to the display 7. The antenna 14 may be supported on either end of either portion of the bracelet 2 in a manner to extend across the supported portion, so that an axis of the antenna 14 is parallel to the user's arm. Also provided are a conventional microphone 15 (constituting a mouth piece)

mounted on the portion 2a and a speaker unit 16 (constituting an ear piece) located on the angled end 12 of the plate 9.

Figure 3A:
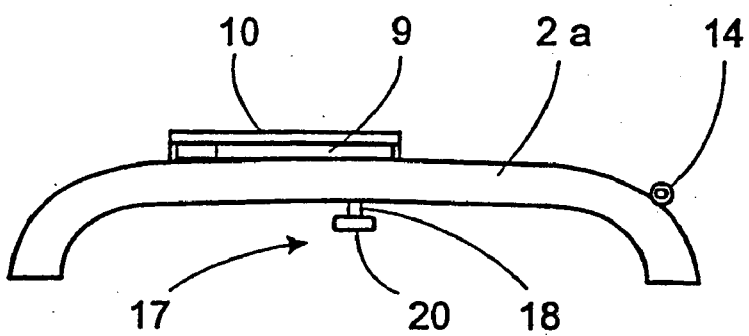
FIG. 3a is a side view of the portion of the device of FIG. 2, more specifically illustrating a mini-vibrator.

As illustrated in FIG. 3a, one of the essential feature of the present invention is the provision of a mini-vibrator 17 having a reciprocating prong 18 projecting from the portion 2a and responsive to a ring signal for prodding the user's wrist so as to inform him/her of an incoming call without disturbing others in the vicinity. A miniature, rubber, disk-shaped washer 20 is attached to a projecting end of the prong 18, which is connected at its opposite end to a conventional cellular phone ringer (not shown) in such a manner that the latter, when actuated by an incoming call, actuates the mini-vibrator 17 causing the reciprocation of the prong 18. In public places where the regular audible ring would disturb, it may be de-actuated, whilst still allowing the user to be informed, via the mini-vibrator 17, of an incoming call. It is evident that the above construction requires substantially small amount of power and does not cause, when in operation, vibrations of the whole device 1.

Figure 3B:
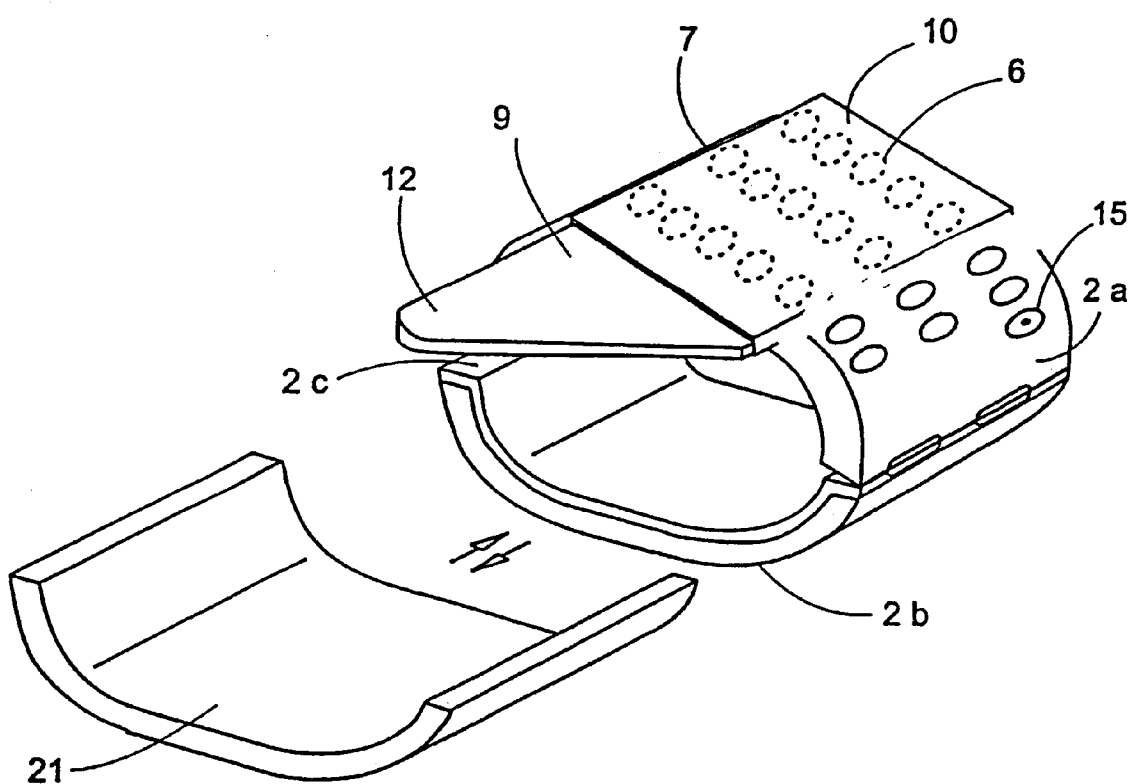
FIG. 3b is a partly exploded view of the device of FIG. 1 with a retracted flip open cover and a battery in its removed position.

Reference is now made to FIG. 3b, illustrating another essential feature of the present invention. A battery 21 is illustrated being shaped like a part of the bracelet 2 and being dimensioned so as to be fit into and removed out of the portion 2b which is generally hollow and functions as a battery holder member. To this end, the hollow portion 2b is provided internally with a pair of peripheral slots, or guides, so as to allow the battery to be slid in and out in a conventional manner. It is understood, although not specifically shown, that the battery 21 is electrically connected to the respective components of the phone mechanism accommodated in the portion 2a. To this end, electric wires are appropriately located inside the portions 2a and 2b.

If desired, the portion 2b may be of two parts construction both parts being, for example, curved-shaped sections designed so as to accommodate a battery therebetween. The construction may be similar to that used in tapes for inserting and removing cassettes, which is known per se and therefore need not be specifically described except to note that it usually includes a spring arrangement actuated by a press button.

Alternatively, although not specifically shown, the battery 21 itself may be provided with a clasp mechanism of a known type and, when attached, for example, in the manner described above with respect to the portions 2a and 2b, completes the overall bracelet shape, thus functioning as an integral portion 2b of the bracelet. The construction may be such that the portion 2b, i.e. associated with the battery, wraps around the whole wrist 5 and the portion 2a, i.e. associated with the phone mechanism, is appropriately coupled to the portion 2b thereabove. Obviously, instead of single battery as described above, two or more batteries having appropriate electric circuit connectors may be employed. For this purpose, the portion 2b may be formed of two or more segments connected by hinges, short belts or the like, each either carrying a battery thereinside or itself being a battery. In the case of short belts, they are short enough so as not to occupy a significant portion of the wearer's wrist It should be specifically noted that any kind of battery may be employed.

The device 1 being a cellular phone device is designed to include such features of conventional cellular phones as time, date, alarm clock, automatic dialing mode, a phone book, etc. Additionally, a sensor means is provided for automatically putting the device into an operative mode when the plate 10 of the cover is rotated into its open position, and vice versa. All these functions are well known per se and, therefore, need not be specifically described.

The user wears the cellular phone device 1 on his wrist 5, and when using the device, holds his hand to the side of his face in a natural hand position with the bracelet 2 near a region of his mouth. The microphone 15 in the bracelet portion 2a is thereby proximate the user's mouth, whilst the tips of his fingers are close to his ear. The speaker 16 in the extended plate 9 of the cover may now be held near to the user's ear. Cupping of the fingers serves to filter out background noise, and simultaneously provide a resonant external cavity for improving the audio quality of the sound emanating from the speaker.

Figure 4A:
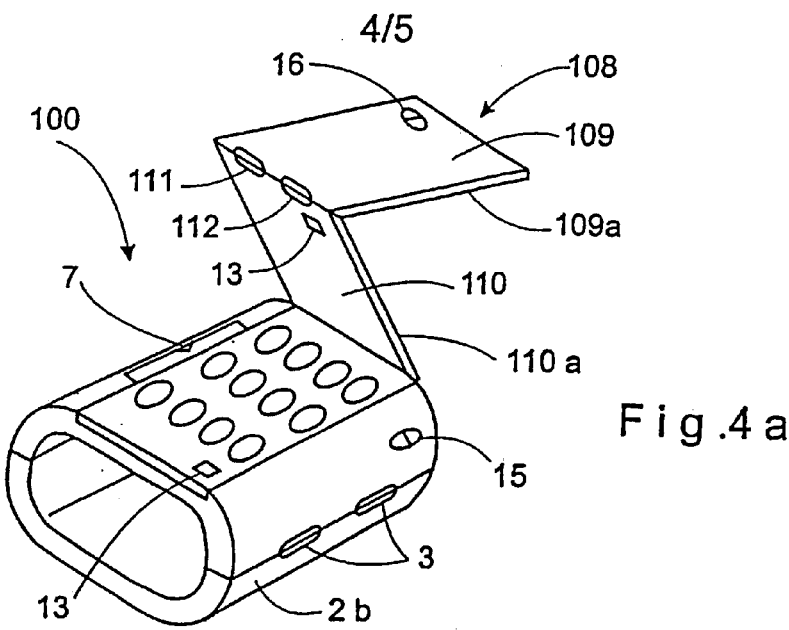
FIGS. 4a to 4c illustrate three more embodiments of the invention.
Figure 4B:
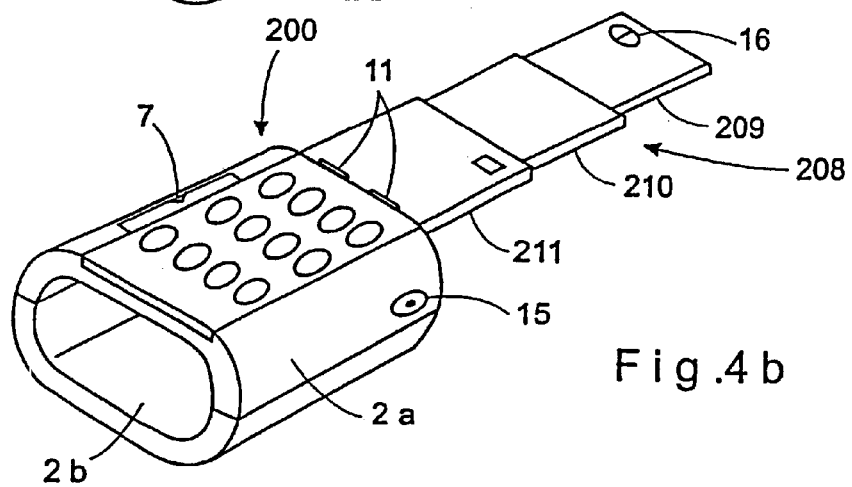
Figure 4C:
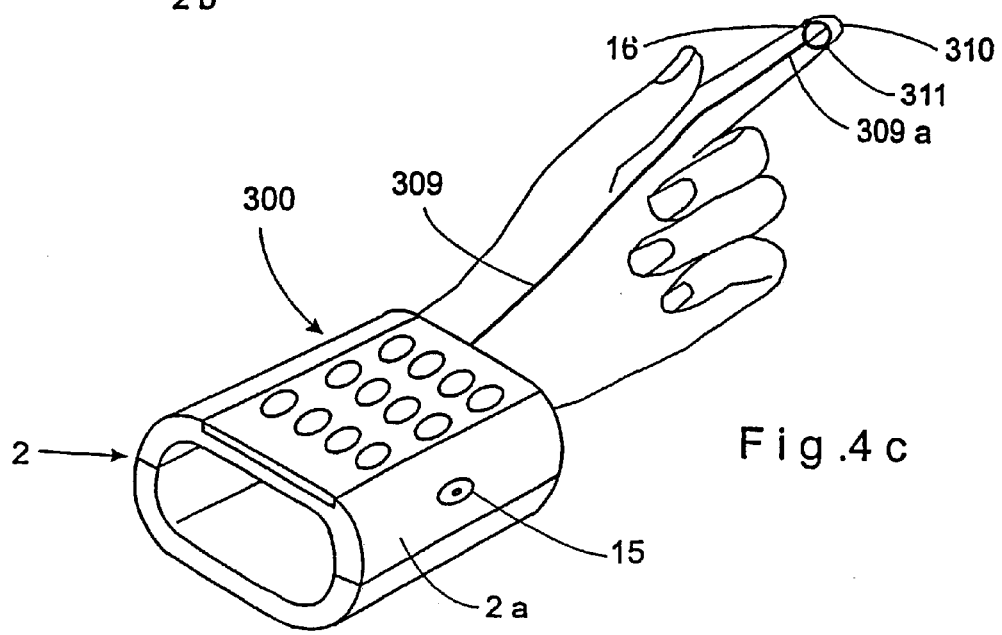

Reference is now made to FIGS. 4a, 4b and 4c illustrating three more embodiments of the present invention, which are in general similar to the above described embodiment and, therefore, those components which are identical in all embodiments are identified by the same reference numerals. Cellular phone devices 100 and 200 are distinguished from each other and from the device 1 by somewhat different constructions of a flip open cover. Thus, as clearly shown in FIG. 4a, a cover 108 is formed of two plates 109 and 110 pivotally coupled by a pair of hinges 111 and 112, wherein the speaker is mounted on the plate 109. It will be readily understood that the cover 108 is foldable and extendable like an accordion. An additional two-part magnetic clasp is provided in a conventional manner on an inner surface 109a of the plate 109 interfacing an inner side 110a of the plate 110, which is not specifically shown. Obviously, such magnetic clasp may be replaced by any other means suitable for the same purpose. A cover 209 of the cellular phone device 200 is a three-plate telescopic cover, wherein a last plate 209 is slidingly insertable into a center plate 210 which, in turn, is receivable by a plate 211 in a manner described above with reference to FIGS. 1–3.

Turning now to FIG. 4c, the cellular phone device 300 has no cover at all and is characterized by a flexible thin tube 309 containing connections to the speaker 16 mounted on its free end 309a. The other ends of the electrical connections are connected to an audio output of the cellular phone. As shown, the free end 309a of the wire 309 is attached to a forefinger 310 of the user by means of a loop 311 (constituting a securing means). Thus, the user's hands are substantially free for operating the phone device 300. A coil spring (not shown) is fixed at one end to the portion 2a and is fixed at an opposite end to the free end 309a of the tube 309. When the tube 309 is drawn into the extended operated position as shown in FIG. 4c, the coil spring is resiliently biased so as to allow for automatic retraction by the coil spring of the tube 309 when required.

It should be noted that both of the C-shaped portions of the bracelet 2 in any of the preferred embodiments described above are preferably formed with rough inner surfaces overlying the user's wrist 5 for preventing undesirable movement of the bracelet 2.

Figure 5A:
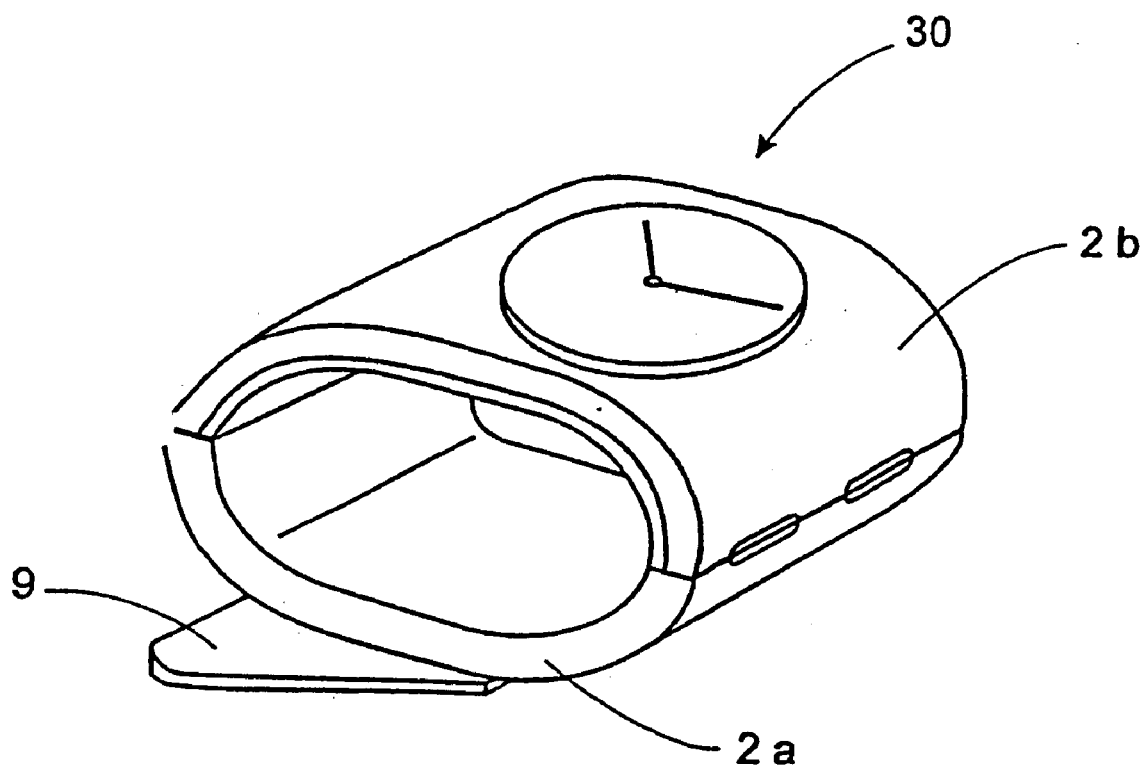
FIG. 5a illustrates still another embodiment of a wrist-mounted cellular phone device having a wrist-watch mounted thereon.
Figure 5B:
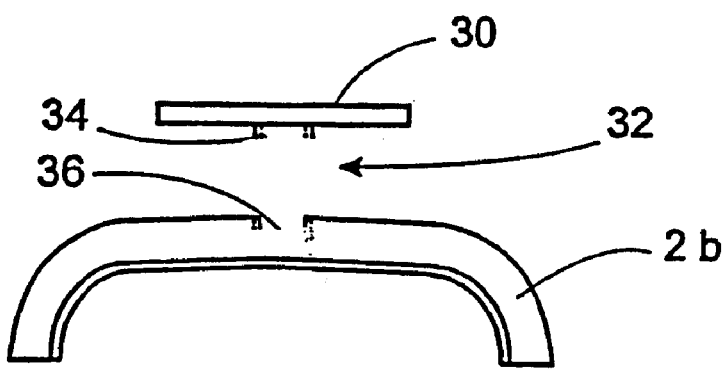
FIG. 5b is a cross-section of the device of FIG. 5a, more specifically illustrating a coupling means for mounting the wrist-watch on to the cellular phone device.

Referring to FIGS. 5a and 5b, there is illustrated a cellular phone device which is similar to any of the preferred embodiments of the invention, for example the device 1, and additionally comprises a watch unit 30 mounted on the portion 2b. To this end, a conventional bolt-and-nut assembly 32 is provided. For example, a screw-threaded bolt 34 projects from a bottom side of the watch unit 30 so as to be received by a nut 36 made in the portion 2b. Obviously, any other means may be used for the same purpose. For example, the watch 30 may be mounted on, or integrally formed with, its housing which, in turn, may be coupled to the bracelet 2 by hinges or the like. It should be noted that the construction may be such that the same battery 21 of the cellular phone device 1 supplies power to the watch 30.

It will be readily appreciated by those skilled in the art that many modifications may be applied to the invention as exemplified without departing from its scope as defined in and by the appended claims. Thus, for example, antenna may be an integral part of either a telescoping or accordion-shaped cover containing the ear piece, or an integral part of the tube attaching the ear piece to the bracelet.

What is claimed is:

1. A wrist mounted telephone device for attaching to a wearer's wrist, said device comprising:

a first housing for containing all components of a telephone unit;

a watch unit having a second housing separately disposed from said wrist mounted telephone device, said watch unit having its own display unit to display time only, said second housing is removably and fixedly attached to said wrist-mounted telephone device, wherein at least said display unit of said watch unit being disposed within said second housing.

2. The device according to claim 1, wherein said components comprise a display unit.

3. The device according to claim 1, wherein when attached to each other, said housing of said telephone unit is disposed on a different location relative to said watch unit, around said wearer's wrist.

4. The device according to claim 1, wherein said housing of said telephone unit is disposed on one side of said wearer's wrist, and said watch unit is disposed on the opposite side of said wearer's wrist.

5. The device according to claim 1, wherein said wrist-mounted telephone device comprises a third housing attached to said first housing, wherein said third housing contains a battery power source.

6. The device according to claim 5, wherein said watch unit is removably and fixedly attached to said third housing.

7. The device according to claim 6, wherein said watch unit is in opposite relationship with said first housing around said wearer's wrist.

8. The device according to claim 7, wherein said watch unit and said third housing are in opposite relationship with said first housing around said wearer's wrist.

9. The device according to claim 1, wherein said watch unit functions independently from said phone unit.

10. The device according to claim 1, wherein said wrist-mounted telephone device is in a shape of a bracelet, wherein all components used by said telephone unit are integrated within said bracelet;

said second housing being fixedly and removably attached to said bracelet and said housing of said watch unit and said housing of said phone unit having any width and any shape regardless of width and shape of each other.

11. The device according to claim 10, wherein said bracelet has at least two housings, wherein said housings comprise at least part of said telephone components.

12. The device according to claim 11, wherein said housings have any desired width.

13. The device according to claim 11, wherein said housings have any desired shape.

14. The device according to claim 10, wherein said bracelet has at least two housings, wherein each of said housings, at one end is permanently attached to the other housing, and at the opposite end is openably attached to other housing.

15. The device according to claim 1, wherein said wrist mounted telephone device is in a shape of a bracelet further comprising:

said bracelet having at least two sections, wherein each of said sections has a corresponding attachment means, wherein a first permanent attachment means is located at one end of each of said sections, so as to permanently attach each of said sections to a neighboring section and a second attachment means located at the opposite end of each of said sections for openably attaching said sections together.

16. The device according to claim 15, wherein said bracelet and said watch unit comprise attachment means to attach to each other, wherein said watch unit attachment means and said second attachment means for openably attaching are different.

17. The device according to claim 15, wherein said sections of said bracelet comprise different attachment means.

18. The device according to claim 15, wherein one of said sections comprises a housing to accommodate a battery power source.

19. The device according to claim 15, wherein said battery power source extends circumferentially around at least a portion of said wearer's wrist.

20. The device according to claim 15, wherein said battery power source is removably inserted in said housing.

21. The device according to claim 15, wherein said battery power source is slidably inserted in said housing.

22. The device according to claim 15, wherein said battery power source comprises a plurality of batteries.

23. The device according to claim 22, wherein each of said plurality of battery power sources is connected to said telephone unit so that, when said bracelet is opened from said user's wrist, said telephone unit still functions.

24. The device according to claim 23, wherein said permanent attachment means comprises a strap.

25. The device according to claim 23, wherein said permanent attachment means comprises a hinged connection.

* * * * *